United States Patent [19]

Sharp

[11] 4,256,375

[45] Mar. 17, 1981

[54] REMOTE CONTROLLABLE MOTORIZED REAR VIEW MIRROR

[75] Inventor: Bernard C. Sharp, White Plains, N.Y.

[73] Assignee: Parker-Hannifin Corporation, Shelton, Conn.

[21] Appl. No.: 14,801

[22] Filed: Feb. 26, 1979

[51] Int. Cl.³ .............................................. G02B 5/08
[52] U.S. Cl. .................................................. 350/289
[58] Field of Search ....................... 350/289; 248/479

[56] References Cited

U.S. PATENT DOCUMENTS

| 2,877,686 | 3/1959 | Foster | 350/289 |
| 3,005,384 | 10/1961 | Baird et al. | 350/289 |
| 3,008,375 | 11/1961 | Henderson | 350/289 |
| 3,576,359 | 4/1971 | Cosh | 350/289 |
| 3,610,736 | 10/1971 | Bateman | 350/289 |
| 3,830,561 | 8/1974 | La Fave et al. | 350/289 |
| 4,056,253 | 11/1977 | Repay et al. | 350/289 X |
| 4,158,483 | 6/1979 | Fisher et al. | 350/289 |

Primary Examiner—F. L. Evans
Attorney, Agent, or Firm—Albert C. Johnston; Louis H. Reens

[57] ABSTRACT

A rear view mirror for vehicles is provided on a mirror housing having a remotely controllable motorized driving unit mounted inside it for turning the housing to adjust the mirror viewing range, yet enabling displacement of the housing without effect from or to the driving unit. A gear casing having an electric motor mounted on it contains speed reducing gears, is supported on and turnable about a mirror supporting post protruding from the housing, and is fixed to the housing to position the housing by movement about the axis of a ring gear that normally is held fixed relative to the post. The ring gear is connected with the post via a spring biased clutch that slips to enable forcible turning of the housing by hand or in the event of impact with an obstruction.

11 Claims, 4 Drawing Figures

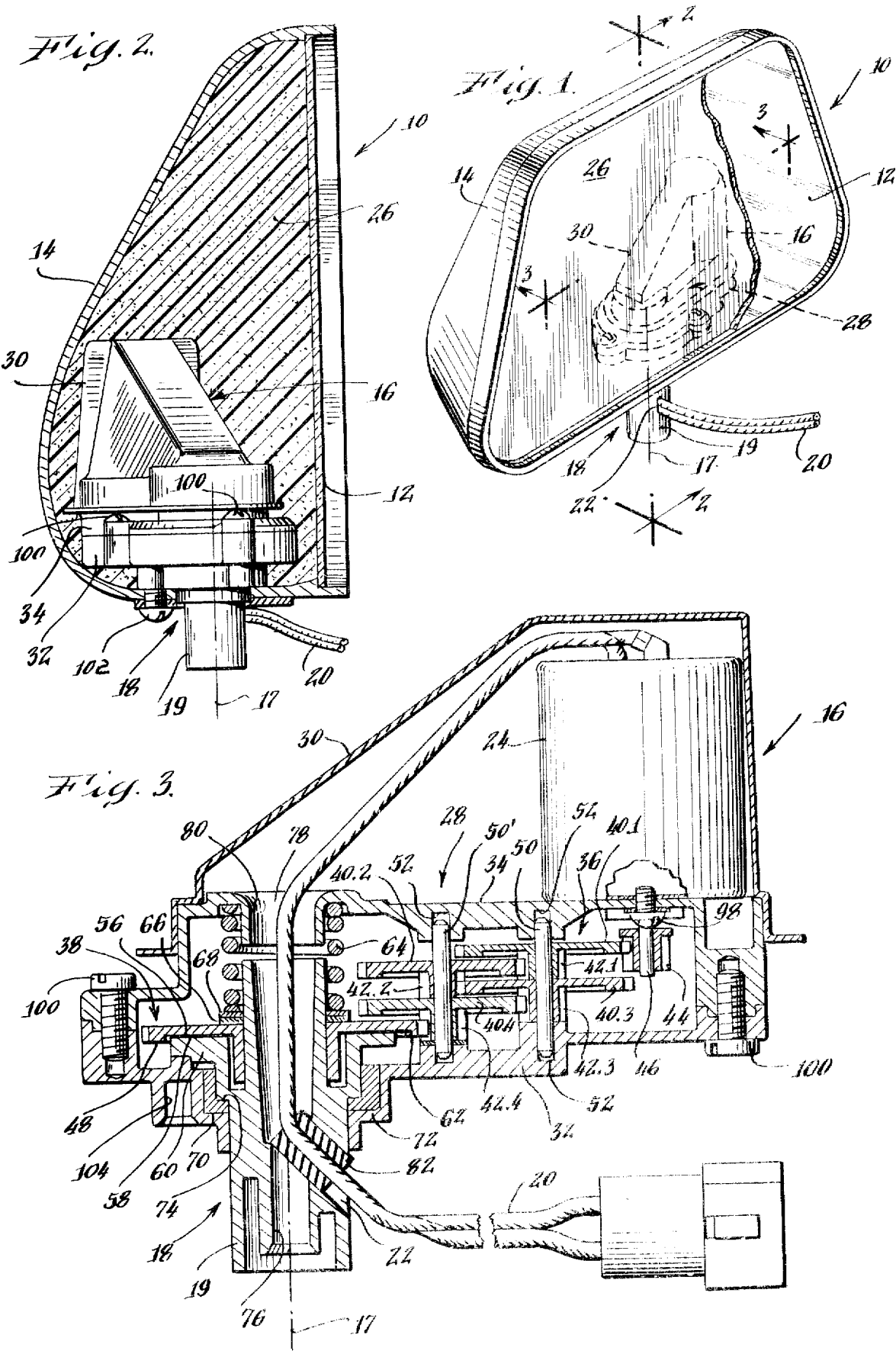

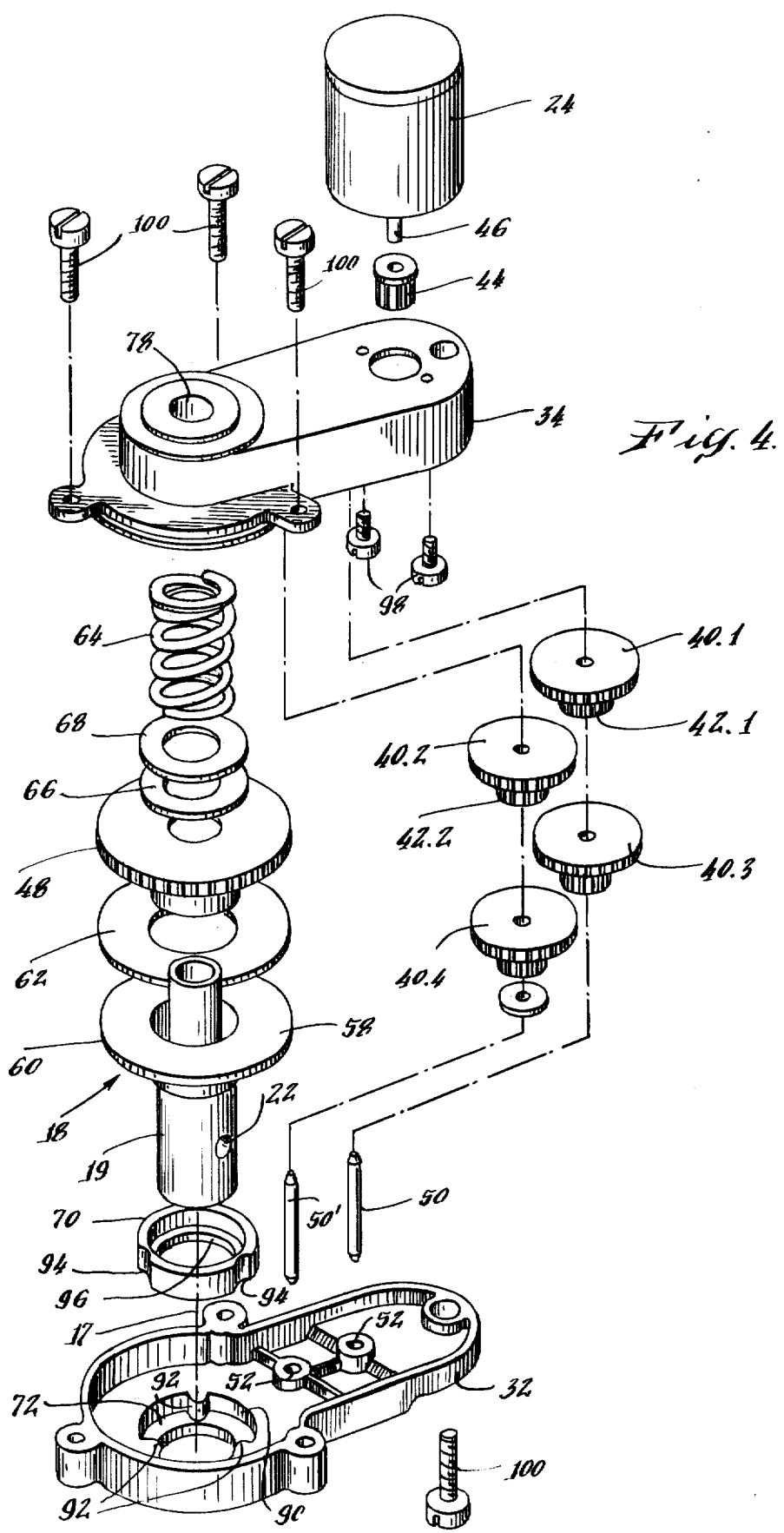

REMOTE CONTROLLABLE MOTORIZED REAR VIEW MIRROR

This invention relates to a motor driven mirror and, more particularly, to a vehicle rear view mirror that can be positioned to adjust the mirror viewing range by remote control from the driver's location in a vehicle equipped with the mirror.

Remotely operable rear view mirrors are needed on motor vehicles to enable convenient and quick adjustment of a driver's rear viewing range from a location inside the body or cab of a vehicle. The provisions of such mirrors is especially important for large cabs being used to tow trailers.

Among various known forms of such mirrors are those described in U.S. Pat. Nos. 3,008,375 (Henderson), 3,576,359 (Cosh), 3,610,736 (Bateman) and 4,056,253 (Repay et al). In the Bateman patent, for instance, an electric motor inside a mirror housing acts through a speed reduction gearing and a slip clutch to turn the mirror housing about the axis of supporting shafts which are connected to upper and lower legs of a U-shaped bracket protruding from a vehicle.

It is important that a motorized rear view mirror be simple and economical to manufacture and assemble and reliable in operation and durability under the severe service and weather conditions to be expected in its use. The principal object of this invention is to provide such a mirror.

In accordance with the present invention, a remotely controllable motorized rear view mirror is provided which includes a mirror supporting housing carried on a single supporting post that protrudes from a space inside the housing where the post is connected with a motorized driving unit so that, upon operation of the motor of the unit by remote control, the mirror housing is conveniently and quickly turned about the post to desired viewing positions; and the driving unit includes a gear casing which supports an electric motor, is connected with the mirror housing to position it, and contains speed reducing gears that connect the motor shaft with a ring gear mounted on the post coaxially therewith. The ring gear is normally held in a fixed position relative to the mirror supporting post by a slip clutch connection that enables forcible turning of the mirror housing without operation of the driving unit, as in the event of impact with an obstruction, and also prevents damage to the driving unit in the event the motor continues to operate when the mirror housing has reached a limit of its range of turning movement.

As a further feature of the invention, the mirror housing provides a relatively large space inside it which is filled with a mass of foamed plastic material so that the driving unit is embedded in this mass and then is cushioned against shocks and damage in the event of impact of the mirror housing with an obstruction.

According to another feature of the invention, the mirror supporting post is provided with an axial cavity extending from a lateral passageway in a lower portion of the post outside the mirror housing to an opening in the gear casing above the post, so that electrical wire means can readily be passed through the post and gear casing to the motor on this casing for energizing and controlling the operation of the motor.

The gear casing of the motorized driving unit in accordance with the invention is preferably constituted by upper and lower casing sections formed with peripheral wall portions that mate with each other and are easily assembled and fastened together so as to enclose and support the mirror supporting post and the speed reduction gearing. The lower casing section is formed to receive gear components and has an annular socket portion depending from it to contain an annular thrust bearing into which an annular shoulder on the post is seated. The post is also provided with an annular flange above that shoulder, and with an upper portion which is located inside and extends above the flange and carries rotatably a ring gear engaged with gears in the casing. A coil spring compressed between the ring gear and an annular seat on the upper casing section presses together co-engaging surfaces of the ring gear and the annular flange on the post so that the ring gear normally is held fixed relative to the post, but can turn relative to the post when need occurs.

The speed reduction gearing includes interengaged spur and pinion gears supported rotatably on parallel shafts. The shafts have respective upper and lower ends seated in sockets formed in the upper and lower casing sections. The driving unit can be assembled simply by placing the post, the ring gear, the spring and the series of gears into the lower casing section, fastening the motor onto the upper casing section, and then fitting and fastening the upper casing section onto the lower casing section.

The above mentioned and other objects, features and advantages of the invention will be further understood from the following detailed description of a preferred embodiment of the invention, in which reference is made to the accompanying illustrative drawings. In the drawings:

FIG. 1 is a perspective view, with the reflecting surface partially broken away, of a motor driven rear view mirror in accordance with the invention;

FIG. 2 is a partial sectional view thereof in side elevation;

FIG. 3 is a vertical sectional view of the driving unit of the mirror; and

FIG. 4 is an exploded perspective view of the components of the driving unit.

With reference to FIG. 1, a motorized rear view mirror 10 for a vehicle is shown. The mirror 10 has a reflector attached to a housing 14 which encloses a motorized driving unit 16. A mirror supporting post 18 is provided with a lower portion 19 to extend below mirror 10 for attachment to a suitable bracket (not shown). Driving unit 16, when energized, causes mirror 10 to be rotated about an axis 17 which is coaxial with the supporting post 18.

An electric wire 20 is passed through a lateral passageway 22 in supporting post 18 for connection to an electric motor 24 (see FIG. 3) in driving unit 16. As shown in FIGS. 1 and 2, a urethane foam 26 substantially fills housing 14 to enclose and cushion driving unit 16 for its protection against shock and moisture. The driving unit 16 may be so mounted to mirror housing 14 that the rotational axis 17 and post 18 are inclined relative to the orientation employed in FIG. 1 to accommodate different viewing angles for drifferent drivers.

Referring to FIGS. 3 and 4, driving unit 16 is formed of a gear casing 28 from which supporting post 18 protrudes with a lower portion 19. A cover 30 is fastened to the top of gear casing 28 to enclose a motor 24. The gear casing 28 is formed of lower and upper mating casing sections 32, 34 between which a speed reducer 36 and friction clutch 38 are mounted.

The speed reducer 36 within gear casing 28 is formed of a number of interengaged spur and pinion gears 40, 42 which interconnect a pinion 44 on motor output shaft 46 to a ring gear 48 coaxially mounted to supporting post 18. The spur and pinion gears 40, 42 freely rotate about shafts 50, 50' which are press fit into sections 32, 34 with slight interference fits in sockets 52 in casing sections 32, 34.

The slip clutch 38 within gear casing 28 is formed between co-engaging annular surfaces 56, 58 respectively on ring gear 48 and an annular flange 60 of supporting post 18. A suitable annular frictional clutch facing material 62 may be employed by adhesion to one of the surfaces 56 or 58. A coiled spring 64 is coaxially mounted with supporting post 18 and is used in compression to press the clutch surface 56 of ring gear 48 in engagement with the surface 58, or as shown in the embodiment of FIG. 3 with clutch facing material 62 adhered to flange 60 of supporting post 18. A washer 66 and annular thrust bearing 68 are interposed between spring 64 and ring gear 48 to enable the latter to rotate relative to coiled spring 64 should this be necessary in case of shock.

Normally, however, the slip clutch 38 is effective to prevent rotation of ring gear 48 relative to coiled spring 64 and supporting post 18 so that upon energization of electric motor 24, the rotation of pinion 42.4 in the speed reducer 36 causes driving unit 16 and thus the entire rear view mirror 10 to rotate about ring gear 48 and supporting post 18. To facilitate mirror rotation, an annular thrust bearing 70 is used between supporting post 18 and the lower casing section 32 of gear casing 28.

The thrust bearing 70 is seated between an upwardly facing annular shoulder 72 of lower casing section 32 and a downwardly facing annular shoulder 74 of supporting post 18. As a result of an upwardly directed component of the force from spring 64, the thrust bearing 70 is pulled up to axially seat on the supporting post shoulder 74, thus enabling smooth rotation of the gear casing 28 about the supporting post 18.

An electrical connection to motor 24 is made by passing an electric wire through lateral passageway 22 in supporting post 18 and an axial cavity 76 in a lower portion of supporting post 18. The upper casing section 34 has an opening 78 in a tubular projection 80 which is located in general alignment with axial cavity 76 of supporting post 18 so that wire 20 can be passed therethrough for connection to motor 24. A suitable rubberlike strain relief 82 is used to retain wire 20 in passageway 22.

The anchoring of coiled spring 64 at one end against the upper casing section 34 of gear casing 28 and at the other end effectively against the ring gear 48 serves two functions. One function is to provide a desired predetermined slip cutch pressure. Another function is to provide a spring loaded mounting of the entire mirror 10 relative to supporting post 18 with resilience against forces parallel to the mirror rotational axis 17. Hence, with a rear view mirror 10 in accordance with the invention, an ability to absorb both rotational and axial shocks is obtained.

Assembly of the driving unit 16 is conveniently carried out as can be observed from the exploded view of FIG. 4. The lower casing section 32 has a socket portion 90 to receive annular thrust bearing 70. Socket portion 90 has peripherally located radially inwardly extending protrusions 92. The thrust bearing 70 freely fits into socket 90 to seat on shoulder 72 and has peripherally located indentations 94 sized to receive protrusions 92 and thus prevent rotation of thrust bearing 70 relative to gear casing 28.

The thrust bearing 70 has a through bore 96 through which supporting post 18 fits to protrude below the gear casing 28 with lower portion 19 as illustrated in FIGS. 1–3. Other components for driving unit 16 can then be assembled onto the lower casing section 32 in the order as illustrated in FIGS. 3 and 4. The motor 24 with its drive pinion 44 on shaft 46 is attached with screws 98 to upper casing section 34. Closure of gear casing 28 is completed by applying the upper casing section 34 with its attached motor 24 to the lower casing part 32 with self-tapping screws 100. Attachment of gear casing 28 to mirror housing 14 is obtained with three self-tapping screws 102 (see FIG. 2) engaging mounting holes 104 in the lower casing section 32 (see FIG. 3).

While the invention has been described and illustrated with reference to the particulars of a preferred form of embodiment thereof, it will be apparent that the new features herein set forth are not restricted to the illustrated embodiment, but may also be employed in various other forms.

I claim:

1. In a rear view mirror positionable by remote control, including a mirror housing and a motorized driving unit mounted inside said housing for turning the housing about a relatively fixed axis to adjust the viewing range of a mirror fixed to the housing, the improvement wherein said unit comprises:
   (1) a mirror supporting post having a lower portion thereof protruding from said housing to be fixed to a support for mounting the mirror on a vehicle,
   (2) a gear casing supported on and turnable about said post, said casing being fixed to said housing and containing gear means including a ring gear coaxial with said post, means normally holding said ring gear fixed relative to said post, and a series of speed reducing gears supported by said casing and drivingly engaged with the periphery of said ring gear, and
   (3) a rotary electric motor supported on said casing and drivingly engaged with said series of gears for driving the latter and thereby turning said casing and said housing relative to said post.

2. A rear view mirror according to claim 1, said post having a cavity extending axially therein and having a passageway extending laterally from said cavity through said lower portion, said casing having an opening there-through in a portion thereof above said post, and electrical wire means extending through said passageway, said cavity and said opening to said motor for energizing said motor.

3. A rear view mirror according to claim 1 or claim 2, said casing having an open annular socket portion depending therefrom, said socket portion containing an annular thrust bearing and said post having thereon an annular shoulder seated in said thrust bearing.

4. A rear view mirror according to claim 1 or 2, said ring gear being fixed rotatably on an upper portion of said post, said post having thereon an annular flange underlying said ring gear, said holding means comprising axially co-engaging annular surfaces respectively of said ring gear and said flange and means pressing said surfaces together with a predetermined force, whereby upon obstruction of the turning of said housing when said motor is active said ring gear will be rotated relative to said post.

5. A rear view mirror according to claim 1, said gear casing being constituted by upper and lower casing sections having peripheral wall portions that mate and are fastened together to enclose and support said post and said gear means, said lower casing section having an upwardly open annular socket portion depending therefrom, said socket portion containing an annular thrust bearing and said post having thereon an annular shoulder seated in said thrust bearing, said post having an annular flange thereon above said shoulder and having inside said flange an upper portion extending above said flange, said ring gear being fitted rotatably on said upper portion, said holding means comprising axially co-engaging surfaces respectively of said ring gear and said flange and a coil spring compressed between said ring gear and an annular seat on said upper casing section for pressing said surfaces together with a force enabling rotation of said ring gear relative to said post upon obstruction of the turning of said housing when said motor is active, said series of gears comprising a plurality of inter-engaged spur and pinion gears supported rotatably on two parallel shafts, said shafts having their respective upper and lower ends seated in respective sockets formed in said upper and lower casing sections, whereby said motor driven unit can be assembled by placing said post, said ring gear, said spring and said series of gears into said lower casing section, fastening said motor onto said upper casing section, and then fitting and fastening said upper section onto said lower section.

6. A rear view mirror according to claim 5, said post having a cavity extending axially therethrough and aligned with an opening formed through said upper casing section inside said annular seat, said post having a passageway extending laterally from said cavity through said lower portion of the post, and electrical wire means extending through said passageway, said hollow and said opening to said motor for energizing said motor.

7. A rear view mirror according to claim 1, said driving unit being embedded in a mass of foamed plastic material substantially completely filling said mirror housing so that said unit is protected against shocks.

8. In a rear view mirror positionable by remote control, including a mirror housing and a motorized driving unit mounted inside said housing for turning the housing about an axis to adjust the viewing angle of the mirror, the improvement wherein said unit comprises
 a mirror supporting post having a lower portion thereof protruding from said housing to be fixed to a support for mounting the mirror on a vehicle;
 a gear casing retained by and turnable about said post and fixed to said housing, a ring gear mounted coaxially with the post inside the gear casing, said post protruding from one part of the gear casing, a series of speed reducing gears supported by said casing and drivingly engaged with the periphery of said ring gear;
 a rotary electric motor supported on said casing and drivingly engaged with said series of gears for driving the latter and thereby normally turning said casing and said housing about the ring gear and said axis;
 a slip clutch operative between said post and the ring gear; and
 a spring operative between the ring gear and another part of the gear casing to provide a slip clutch engaging force to enable said mirror housing to rotate in response to activation of the motor while permitting said mirror to turn in response to a turning force applied when the electric motor is deenergized.

9. A rear view mirror according to claim 8, said post having, inside said casing, an annular shoulder juxtaposed said ring gear to form said slip clutch therewith.

10. A rear view mirror according to claim 9 wherein said gear casing is formed of upper and lower mating sections with said post having an annular shoulder inside the gear casing, with the post protruding from said lower gear casing section, said lower section having a socket portion sized to effectively support the annular shoulder of the post for retention thereof.

11. A rear view mirror according to claim 10 and further including an annular thrust bearing interposed between the annular shoulder of said post and the lower gear casing section.

* * * * *